Aug. 3, 1965  R. E. NUZUM  3,198,619
TUBULAR FOREHEARTH FOR GLASS FURNACE
Filed Dec. 16, 1960  2 Sheets-Sheet 1
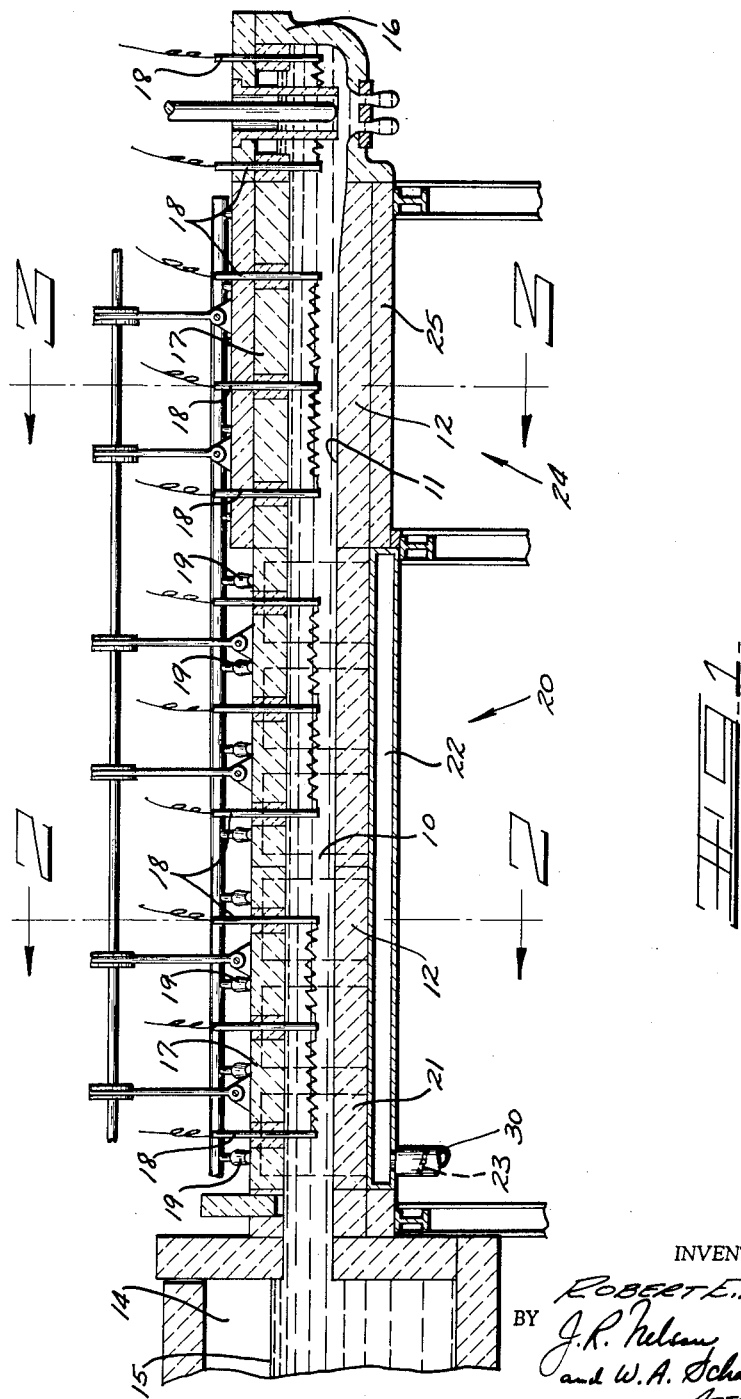
INVENTOR.
ROBERT E. NUZUM
BY J. R. Nelson
and W. A. Schaich
ATTORNEYS

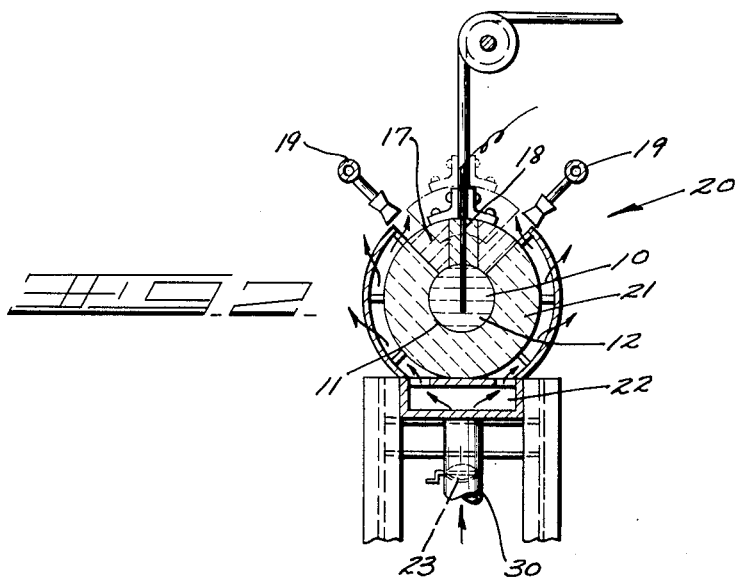
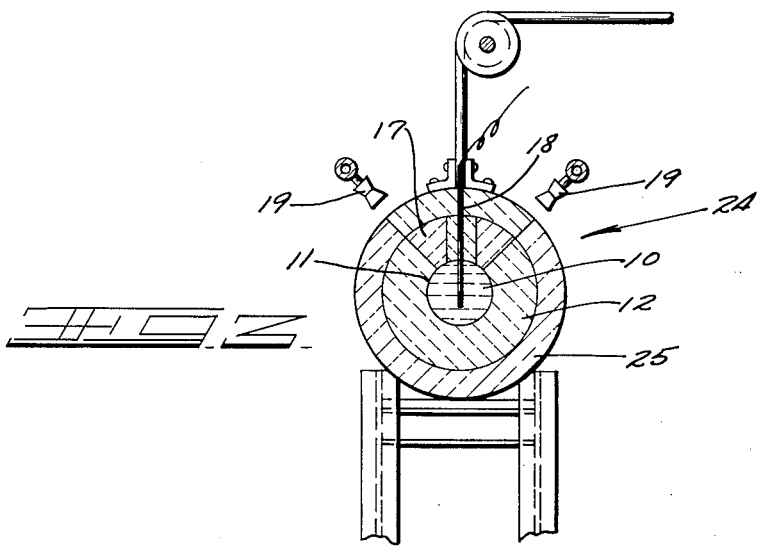

United States Patent Office 3,198,619
Patented Aug. 3, 1965

3,198,619
TUBULAR FOREHEARTH FOR GLASS FURNACE
Robert E. Nuzum, Sylvania, Ohio, assignor to Owens-Illinois Glass Company, a corporation of Ohio
Filed Dec. 16, 1960, Ser. No. 76,388
3 Claims. (Cl. 65—346)

My invention relates to glass furnace forehearths and, more particularly to an improved forehearth structure wherein the refractory channel is tubular in shape completely enclosing the molten glass introduced therein for flow therethrough. In such a forehearth, there is utilized complete laminar flow of the molten glass and, by constructing the refractory walls of uniform thickness, there may be achieved uniform heat insulation between the molten glass and the refractory cross-section of the tubular forehearth.

Heretofore the prior art has provided glass forehearth channels which are more or less of a rectangular cross-section and serve in the manner of a trough enclosure for the flow and conditioning of glass between a refiner chamber and a feeder. The feeder utilizes a bowl structure connected with the outer end of the forehearth wherein glass is maintained and fed through one or more underlying orifices as streams. Periodically, these streams are severed to form molten charges of the glass which are conveyed to a forming machine and formed into a manufactured article. In the conventional forehearth, the viscosity of the glass varies with inherent differentials in temperature through the cross-section of the glass therein. Since the surface of the glass is exposed to air and the sides and bottom of the glass are in contact with refractory walls of the channel structure, there is a differential between the surface and bottom and sides of the cross-section of the glass in the forehearth, as compared with the central section or core of the glass flowing therein. Thus, the glass resists flow according to its viscosity. The central laminate will under most circumstances be the least viscous and the hottest glass, since it is surrounded with molten glass. It is therefore the least susceptible to temperature variation. This creates a problem of conditioning the molten glass so that it is maintained in a homogeneous condition with desired temperature and viscosity at the feeder. The more viscous laminates of the glass at the margins of the forehearth channel have a tendency to become stagnate and yield to flow through the channel of the less viscous glass and it is therefore practically impossible to condition the molten glass so that it is in homogeneous condition with desired temperature and viscosity uniformly throughout the channel.

It is accordingly one object of the invention to condition molten glass so that it is in a homogeneous condition with desired temperature and viscosity at the time it appears in the glass feeder.

A further object of the invention is to provide a novel forehearth structure which enables a uniform heat transfer between the molten glass and the refractory at any given cross-section.

It is still another object of the invention to provide a novel forehearth structure for achieving the foregoing objects but which is flexible in its operation and easily maintained by providing for heating or cooling of the glass as it flows through the forehearth channel.

An additional object of the invention is to provide a tubular forehearth having complete laminar flow of the molten glass therethrough.

The specific nature of this invention, as well as other objects and advantages thereof, will become apparent to those skilled in the art from the following detailed description, taken in conjunction with the annexed sheet of drawings, on which by way of preferred example only, is illustrated an embodiment of this invention.

In the drawings:

FIG. 1 is a longitudinal section of a tubular forehearth, in accordance with the present invention;

FIG. 2 is a transverse vertical section taken on line 2—2 of FIG. 1; and

FIG. 3 is a transverse vertical section taken on line 3—3 of FIG. 1.

Referring to the drawings, molten glass 10 flows through the tubular channel 11 formed by the refractory 12 which is of tubular shape and predetermined diameter.

One end of the tubular forehearth channel 11 is connected to the refiner 14 in which the glass level 15 is slightly higher than the top of the tubular channel. The feeder spout 16 is connected to the other end of the tubular channel 11.

The molten glass 10 is heated by Joule effect of current passed through the glass between electrodes 18 which are held in place in the cap sections 17 and extend downwardly into the tubular channel 11.

The top section of the tubular forehearth is removable at the cap sections 17 in order to permit the introduction of gas for heating from gas burners 19 directed across the surface of the molten glass 10. In the event of an electrical failure these gas burners may be fired to prevent the glass from solidifying. Also the removable cap sections 17 permit easy inspection and replacement of heating electrodes 18.

The tubular forehearth is constructed and arranged in longitudinal sections. The first section adjacent the refiner connection comprises a cooling section 20 which has cooling jackets 21 covering part of the refractory 12. The cooling jackets 21 direct cooling wind over the refractory 12 and are connected to the cooling wind duct 22 by means of dampers 23 which regulate the flow of cooling wind into the cooling jackets 21. The second section is the conditioning section 24 which has the refractory 12 completely covered by insulation 25 in order to retard heat transfer between the molten glass 10 and the refractory 12.

Constituted as described, the tubular forehearth is suitable for conditioning molten glass 10 so that it is in a homogeneous condition with desired temperature and viscosity at the feeder spout 16.

Depending upon the flow of the molten glass 10 through the cooling sections 20, either cooling wind or additional heat may be required, or both cooling wind and additional heat in combination could be required.

The cooling air is supplied to the refractory jacket by the wind duct 22 under the length of the cooling section and the dampers 23 in the inlet pipe 30 will control the volume of wind admitted. As shown on FIG. 2, the cooling jacket 21 encloses three-quarters of the exterior circumference of the forehearth refractory of the tubular channel 11. The jacket 21 extends over the length of the cooling section and exhausts cooling air at the upper side of the jacket, as shown by the arrows on FIG. 2. When the dampers 23 are completely closed, the cooling jacket 21 will act as a dead air space and serve as an insulator. Additionally, electric heaters (not shown) may be provided in combination with the space defined between jacket 21 and the refractory exterior of the forehearth 11 so that when the heaters are energized heating may be thereby provided for the cooling section. The amount of heat input into the cooling section may be controlled to maintain a desired temperature for the molten glass in the channel 11. On heavy pull of the molten glass through the forehearth, a large quantity of cooling air may be required to be supplied to the cooling jacket 21 along the cooling section. On a light pull of molten glass through the forehearth, heating in place of cooling or closing off of the cooling air to the cooling jacket may be required for best operation. The forehearth is thereby regulable for varying furnace loads.

The electrical input to the electrodes 18 is controlled by conventional power circuit (not shown) in order to control the amount of heat supplied internally to the molten glass 10.

The conditioning section 24 is insulated by the sheath 25 of insulating refractory or other material in order to slow down the heat transfer between the molten glass 10 and the refractory 12.

The length and inside diameter of the tubular forehearth channel 11 can be predetermined by the tonnage of molten glass that is intended to be pulled through it.

While embodiments of the present invention have been herein specifically described, other embodiments and variations may occur to those skilled in the art after a knowledge of the disclosure herein, and it is desired to include within the scope of the patent granted hereon all such embodiments and variations, and more particularly as comprehended by the appended claims.

I claim:
1. In a glass furnace including a refiner wherein a body of molten glass is continuously undergoing refining, the improvement therein of a forehearth comprising an elongated tubular structure defining a substantially horizontal cylindrical channel, said channel being connected at one end to the glass in the refiner at an outlet submerged in the body of molten glass therein, a glass feeder device connected to the other end of said channel, and a plurality of electrodes mounted on said tubular structure and extending into the glass contained in said channel, the electrodes operable upon being electrically energized for supplying heat to the glass in the channel by Joule effect heating of current passed through said glass disposed therebetween.

2. The furnace defined in claim 1, wherein said tubular structure has an enclosure externally defining a jacketed chamber extending over a part of the length of said structure, said jacketed chamber having an inlet and outlet for circulation of cooling fluid therethrough, and a damper means operatively associated with the jacketed chamber for controlling the flow of cooling fluid therethrough.

3. A glass furnace forehearth comprising, in combination, an elongated hollow refractory structure defining a tubular channel adapted to completely enclose a stream of molten glass admitted at one end and flowing through its other end, cooling jackets externally disposed along part of said refractory for directing cooling wind over the adjacent refractory surface, means for connecting the cooling jackets to a supply of cooling wind and regulating the flow of cooling wind into the cooling jackets, an upper cap segment over a portion of said hollow refractory structure, a plurality of electrodes inserted through the refractory wall at spaced points and extending into the tubular channel, means for electrically energizing said electrodes for heating the molten glass, means for raising said cap segment from said refractory structure and open a top portion thereof to permit alternatively radiant heating by combustible fuel fired onto the glass through said open portion and inspection of the electrodes, burners, means mounting the burners adjacent said cap segment, means to operate the burners for heating the molten glass upon raising said cap segment, and insulation completely surrounding the part of the exterior surface of the hollow refractory longitudinally adjacent said cooling jackets.

References Cited by the Examiner
UNITED STATES PATENTS

| | | | |
|---|---|---|---|
| 2,593,197 | 4/52 | Rough | 65—134 |
| 2,600,490 | 6/52 | De Voe | 13—34 |
| 2,641,454 | 6/53 | Labino | 65—134 |
| 2,707,353 | 5/55 | Honiss | 65—346 |
| 2,767,235 | 10/56 | Herrold et al. | 13—2 |
| 2,808,446 | 10/57 | Lambert | 65—347 |
| 2,900,764 | 8/59 | Long | 65—134 |
| 3,030,434 | 4/62 | Gell | 65—346 |

DONALL H. SYLVESTER, *Primary Examiner.*

ARTHUR P. KENT, *Examiner.*